United States Patent [19]

Mullane et al.

[11] Patent Number: 4,573,260

[45] Date of Patent: Mar. 4, 1986

[54] INDUCTION HEATED INTERCELL FUSION FOR LEAD/ACID STORAGE BATTERY

[75] Inventors: William E. Mullane, Warren, Ohio; David Lund, Minneapolis, Minn.

[73] Assignee: The Taylor-Winfield Corporation, Warren, Ohio

[21] Appl. No.: 749,629

[22] Filed: Jun. 28, 1985

[51] Int. Cl.[4] .............................................. H01M 6/00
[52] U.S. Cl. ..................... 29/623.1; 29/730; 219/9.5; 219/10.43
[58] Field of Search ............. 29/623.1, 730; 219/10.43, 10.57, 10.75, 10.49 R, 9.5, 91.2

[56] References Cited

U.S. PATENT DOCUMENTS

| | | | |
|---|---|---|---|
| 3,544,754 | 12/1970 | Buttke et al. | 429/161 X |
| 3,589,948 | 6/1971 | Adams | 29/623.1 |
| 4,100,674 | 7/1978 | Tiegel | 29/623.1 X |
| 4,501,943 | 2/1985 | Lund | 29/623.1 X |

Primary Examiner—Charles F. LeFevour
Attorney, Agent, or Firm—William J. Ruano

[57] ABSTRACT

Apparatus and method for induction heating "over-the-partition" intercell connections in a lead/acid storage battery by melting both lead risers so as to form a connection over the top of the insulating partition. A mold is suspended on top of the partition and an induction coil is supported on the mold so as to surround the top portion of the intercell lead risers. High frequency alternating electrical current is applied to the coil so as to melt the top portion of the lead risers so that upon fusion thereof in the mold and cooling, the tops of the risers are interconnected. The interconnection bridges the top of the risers and rests on top of the partition. The invention lends itself to mass production in a very short time as compared to present methods. Excellent fusion quality is reliably obtained as compared to present methods.

9 Claims, 12 Drawing Figures

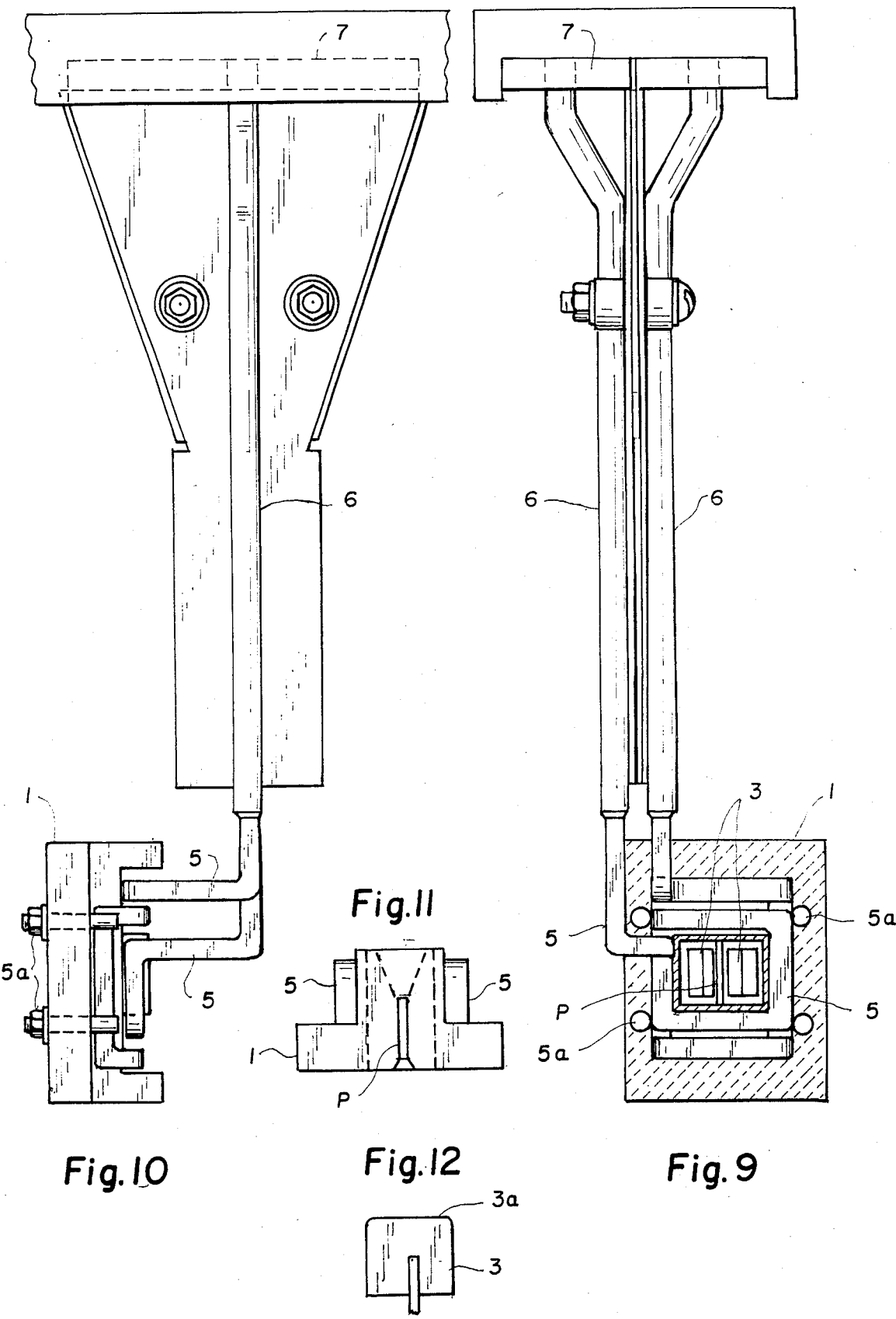

INDUCTION HEATED INTERCELL FUSION FOR LEAD/ACID STORAGE BATTERY

This invention relates to an apparatus and method for intercell fusion of lead/acid storage batteries and, more particularly, to "over-the-partition" type intercell construction.

BACKGROUND OF THE INVENTION

Hand burning by manual use of a gas torch has been used to interconnect cell elements in a lead/acid storage battery. However, such manual operations are relatively slow and yield intercell connections of inconsistent and unreliable quality.

The process of the present invention differs markedly from previously-patented processes as described below:

U.S. Pat. No. 3,544,754 to Buttke, et al., and related patents, refer to a method and apparatus for fusing lead-/acid battery intercell terminals using "extrusion fusion" and resistance welding. Vital to this process is the principle of extruding lead through an orifice in the battery container partition. Since the process of the present invention uses lead intercell terminals that extend above (not through) the battery partition, and since no external pressure is supplied to extrude the lead, and since induction heating (not resistance welding) is utilized, such patent is not pertinent.

U.S. Pat. No. 3,589,948 to Adams refers to various techniques, including induction heating, used to fuse intercell connections through an orifice in battery container partitions. Since the process of the present invention, detailed here, "over-the-partition" induction uses lead intercell terminals that extend above (not through) the battery partition, such patent is not pertinent.

U.S. Pat. No. 4,501,943, to Lund, and related patents, refer to method and apparatus for using external battery top terminal posts. Since the process of the present invention refers to fusion of intercell connectors inside the battery, such patent is not pertinent.

BRIEF SUMMARY OF THE INVENTION

An object of the present invention is to overcome the disadvantages of the above-mentioned manual application of gas torches by providing a novel induction heating assembly for fusing tops of the lead risers of intercells of a lead/acid storage battery.

DETAILED DESCRIPTION OF THE DRAWINGS

Other objects and advantages of the invention will become more apparent from the following description taken with the accompanying drawings wherein:

FIG. 9 is an elevational view, partly in cross-section, of the entire assembly of mold and coil illustrated in FIGS. 1 to 8, including a special bus connection;

FIG. 10 is a side view thereof;

FIG. 11 is an elevational view taken from the lower part of FIG. 9 showing the coil supported on the mold, which mold, in turn, is supported on the partition P, illustrating the lead risers 3 before fusion; and FIG. 12 shows the lead risers in their fused condition 3a.

DETAILED DESCRIPTION OF THE INVENTION

Figure 1:
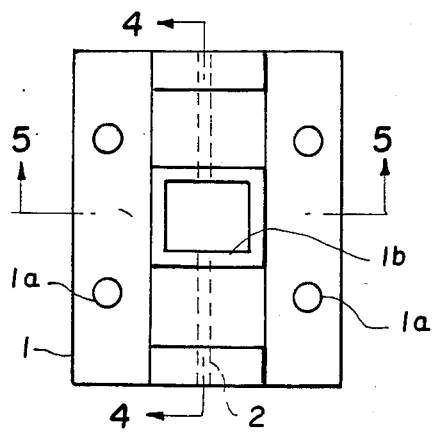
FIG. 1 is a top view of a mold of a construction embodying the present invention and adapted to be supported by the top of the battery partition.
Figure 3:
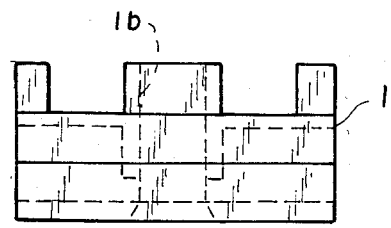
FIG. 3 is a longitudinal side view thereof.
Figure 2:
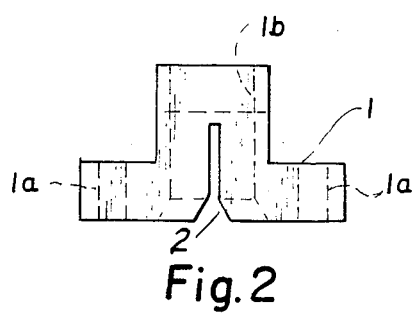
FIG. 2 is a end view.
Figure 4:
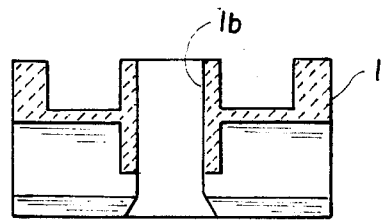
FIG. 4 is a cross-sectional view taken along line 4—4 of FIG. 1.
Figure 5:
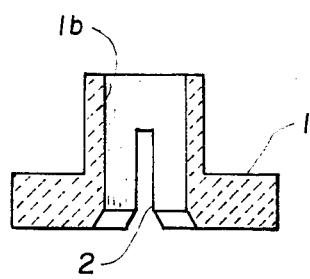
FIG. 5 is a top view taken along line 5—5 of FIG. 1.
Figure 6:
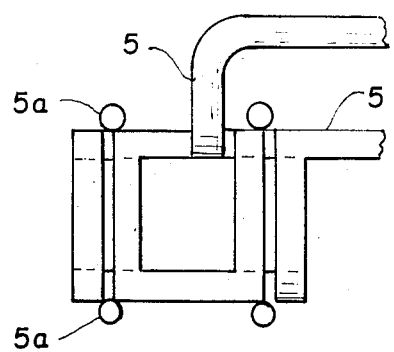
FIG. 6 is a top view of an induction coil having two turns and supported on the mold of FIGS. 1-5.
Figure 7:
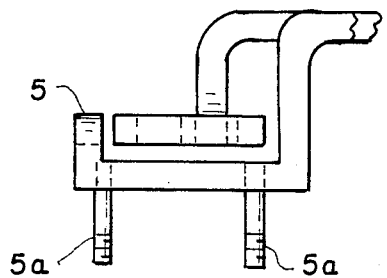
FIG. 7 is a side view looking at the right side of FIG. 6.
Figure 8:
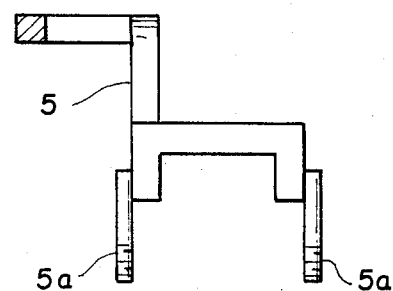
FIG. 8 is an end view or elevation of FIG. 6.

Referring more particularly to FIGS. 1 to 4 inclusive of the drawings, the terminal mold is denoted by numeral 1 which can be of ceramic or refractory material, or of a temperature resistant plastic of Rulon or generic equivalent. Mold 1 has an opening 1b centrally thereof having a slot 2 adapted to fit on top of a partition P of the battery of temperature resistant plastic such as polypropylene. Four holes 1a are drilled to provide a means for interconnection with the coil illustrated in FIGS. 6, 7 and 8 wherein the coil 5 has two turns for surrounding the central portion of the mold. Integrally secured to the lower turn of the coil are four threaded studs 5a adapted to fit into holes 1a of the mold. Integrally secured to the lower turn of the coil are four threaded studs 5a adapted to fit into holes 1a of the mold. The coil 5 may be of rectangular construction of 0.62 by 0.75 dimension and made of 0.18 square copper tubing or any other suitable size.

FIG. 9 and FIG. 10 show the coil and mold assembly, the construction of which have been previously described, together with bus 6 connected to lead blocks 7 for coil adjustment. Leads 6,6 may be of copper, approximately 10 inches long sized 0.12"×3". As will more clearly appear in FIG. 9 and FIG. 11, a battery partition P supports the mold 1 by projecting through slot 2 thereof. Lead components, called risers 3, one on each side of the partition, forming the top portions of inner cells of the battery, will be surrounded by coil 5. Cooling water passes through tubular leads 6,6 and coil 5.

In operation, when high frequency alternating electric current of about 480 KHZ energizes coil 5, it will fuse only the top portion of the lead risers 3 so as to melt the lead down even with the top of the partition P by having it flow into the mold 5, which usually takes only about 1.1 seconds. Thereafter, the fused metal is allowed to cool about 1.5 to 2 seconds to solidify and form a bridging portion 3a which interconnects the top of the lead risers 3 over the partition P. The coil and mold are then removed. Such intercell connections will be of uniformly high quality.

The process may be automated for high production rates of perhaps 4 batteries per minute. Because of the mold and coil construction and arrangement, impurities such as lead oxide which are often trapped in lead battery components during casting, will float up and out of the fusion zone by virtue of the vibration caused by induction heating, thus creating an intercell connection of superior quality. The partition P is not heated sufficiently to melt, even when the partition is made of a temperature sensitive plastic such as polypropylene.

For mass production purposes, the battery is lifted into the coil and mold, the coil energized to fuse the lead risers, and after cooling, the battery is brought down below the coil and indexed to the next connection, which process is repeated, heating and cooling, until all five (or other number) connections are made.

The coil may be on an adjustable bus connection to the induction power source to adjust the height for different size batteries.

Thus it will be seen that we have provided a novel method and apparatus for rapidly interconnecting the series cell elements of a lead/acid storage battery over the top of the battery partitions, which interconnections are of uniformly high quality and which can be made by high speed mass production methods not heretofore achievable.

While we have illustrated and described a single specific embodiment of our invention, it will be understood that this is by way of illustration only and that various changes and modifications may be contemplated in our invention within the scope of the following claims.

We claim:

1. A method of making an intercell connection in a storage battery with "over-the-partion" type riser construction, having vertical partition walls, comprising suspending a mold on the top of a partition wall with half of the mold on each side of said wall, projecting a pair of lead risers of intercell elements through said mold, one on each side of said mold, surrounding said mold and the upper end portion of said partition wall and the upper end portions of said lead risers with a coil, energizing said coil with sufficiently high frequency alternating electric current as to induction heat and melt the tops of said upper end portions of said lead risers to the top of said partition so as to bridge said lead risers over said partition and make an intercell connection, cooling said melted portions to solidification, and finally separating said coil and mold from said risers and partition wall.

2. The method recited in claim 1 wherein said high frequency current is about 480 KHZ and wherein the melting time of said risers is slightly above 1 second and the cooling time for solidification is between about 1½ and 2 seconds.

3. The method recited in claim 1 wherein said coils have vertically adjustable lead-ins to adjust the height for different sized batteries.

4. The method recited in claim 1 wherein the battery, partitions and inner cells are held stationary and wherein said mold and coil are vertically movable downwardly to prepare for intercell melting of the risers and upwardly after solidification of the intercell connection.

5. The method recited in claim 1 wherein said mold and coil are held stationary and wherein said battery, partitions and lead risers are moved upwardly relative to said battery to prepare for intercell melting of the risers and downwardly after solidifying of the intercell connection.

6. The method recited in claim 1 which is repeated from cell to cell to sequentially form single intercell connections for all cells in the battery.

7. The method recited in claim 1 wherein said coil has two turns and is of copper.

8. The method recited in claim 1 wherein said mold is of Rulon or generic equivalent.

9. The method recited in claim 1 wherein said partition is of polypropylene.

* * * * *